Nov. 9, 1954

D. E. WIEGAND

COMBINED MAGNETIC TRANSDUCER HEAD AND COUPLING TRANSFORMER

Original Filed Dec. 4, 1947

2,694,109

Inventor
David E. Wiegand by Hill, Sherman, Meroni, Gross & Simpson Attys

United States Patent Office 2,694,109

Patented Nov. 9, 1954

2,694,109

COMBINED MAGNETIC TRANSDUCER HEAD AND COUPLING TRANSFORMER

David E. Wiegand, Villa Park, Ill., assignor to Armour Research Foundation of Illinois Institute of Technology, Chicago, Ill., a corporation of Illinois Original application December 24, 1947, Serial No. 793,727, now Patent No. 2,585,065, dated February 12, 1952. Divided and this application August 18, 1951, Serial No. 242,570

5 Claims. (Cl. 179—100.2)

This invention relates to a combined magnetic transducer head and coupling transformer, and more particularly, to what is generally known as a single-turn head with the turn going through the gap of the head.

Great improvements have been made in the magnetic recording field in recent years, and to some extent this has been brought about by the development of relatively high coercive force materials which could be formed into a wire or tape for use as a magnetic record member. It has been found that the maximum capabilities of high coercive force material can only be utilized when certain conditions are present. In the recording process, intense magnetic fields are required, and these intense fields are obtained by the present invention with a minimum amount of leakage flux which tends to demagnetize the high frequency. In other words, the effective scanning width of the recording gap is reduced, thus allowing the recording of higher frequencies.

A further feature of the present invention is the ability of heads designed in accordance with the teachings of the present invention to erase high coercive force material without overheating of the head structure. In general, intense magnetic fields in electromagnetic apparatus are obtained only by operating the electrical part of the apparatus at high current density. In the head structures of the present invention, the copper foil in the gap may be operated at extremely high current density because of its short length and because of rapid heat conduction to relatively heavy masses of copper to which the foil is attached at both ends. In this connection, the present invention is particularly advantageous in that the high current density is applied where it is needed the most, or, in other words, in the head gap close to the recording wire.

The head structure of the present invention is also particularly advantageous as a play-back head. In conventional play-back heads of the prior art, a compromise has been made in selecting the width of the head gap. As the width of the gap is decreased, the fineness of scanning is improved, but the leakage flux across the gap surfaces directly under the record member increases. Since this leakage flux does not thread the coil, a reduction in output voltage results. This effect is present for all frequencies. At high frequencies, there is an additional effect in prior art head structures. When the head coil is loaded by a resistor, such as is commonly used in the input circuit of a play-back amplifier, or by the distributed capacitance of the coil itself in associated wiring, the resulting currents in the coil cause an increase in leakage flux. The effect is the same for a head without this additional leakage flux in series with an inductance. In the case of the resistance loading, the effect is a gradual falling off of the high frequencies. The effect of the capacitance loading is to cause a resonant frequency beyond which the response of the head is extremely poor or nil. As a result of these series inductance effects, there is a limit to the number of turns that can be placed on a conventional pick-up head and, therefore, a limit on the voltage which can be supplied by the head.

With a structure such as that of the present invention, part of the flux leaking across the gap and all of the flux leaking below the gap links the turn in the gap, and therefore, is just as effective in producing voltage as the flux which follows the path of the core structure. The result is an increase in output voltage in medium and low frequencies, and also at high frequencies, since the effect of the apparent series inductance of the head is greatly reduced.

It is an object of the present invention to provide a novel combined magnetic transducer head and coupling transformer which is efficient in operation and rugged and reliable in use.

A further object of the present invention is to provide a novel electromagnetic transducer head and assembly which is particularly suited for use with relatively high coercive force materials such, for example, as materials having a coercive force in excess of 300 oersteds.

A still further object of the present invention is to provide a novel single-turn electromagnetic transducer head.

Still another and further object of the present invention is to provide a novel electromagnetic transducer head which may be used either as a recording head, a play-back head or an erase head.

The novel features which I believe to be characteristic of my invention are set forth with particularity in the appended claims. My invention itself, however, both as to its organization, manner of construction, and method of operation, together with further objects and advantages thereof, may best be understood by reference to the following description taken in connection with the accompanying drawings, in which:

This application is a division of my co-pending application for "Combined Magnetic Transducer Head and Coupling Transformer," U. S. Serial No. 793,727, filed December 24, 1947, and assigned to the same assignee as the present invention.

Figure 1:
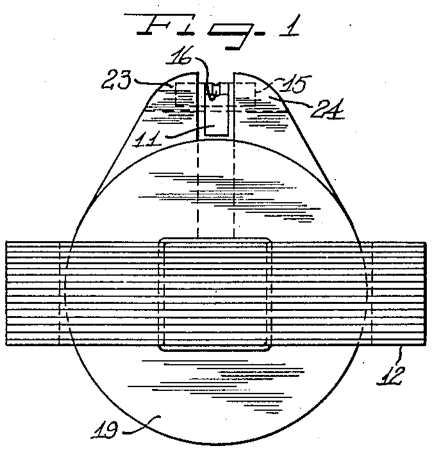
Figure 1 is a front elevational view of an electromagnetic transducer head embodying the novel teachings and characteristics of the present invention.
Figure 2:
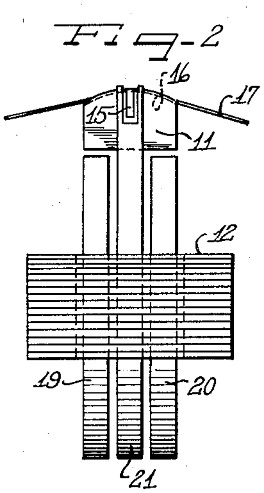
Figure 2 is a right end view of the electromagnetic transducer head shown in Figure 1.
Figure 3:
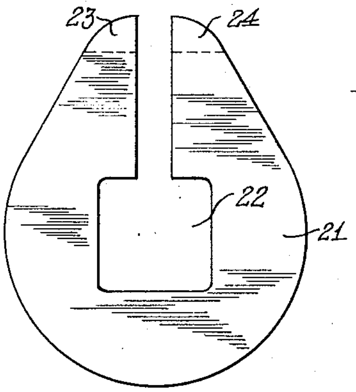
Figure 3 is a front elevational view of a slotted copper plate employed in the structure shown in Figure 1.
Figure 4:
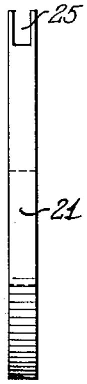
Figure 4 is an end view of the copper plate shown in Figure 3.
Figure 6:
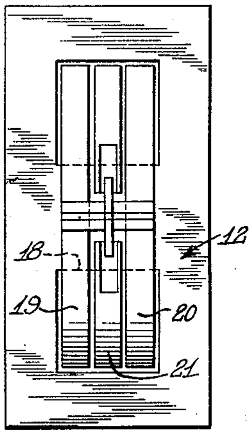
Figure 6 is a top view of the electromagnetic transducer head shown in Figure 1.
Figure 5:
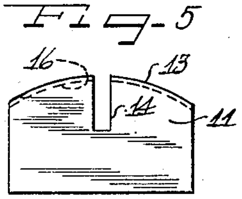
Figure 5 is a view of the head lamination employed in the head structure shown in Figure 1.

In the particular embodiment of the present invention as illustrated in Figures 1 to 6 of the drawings, the electromagnetic transducer head illustrated includes a head lamination 11 and a transformer core 12, each made of magnetic material having relatively high permeability and relatively low retentivity. The head lamination 11 as shown in Figure 5 of the drawings has an arcuate top edge 13 which is slotted as at 14 to receive a copper foil or bar 15 which extends at right angles to the plane of the face of the core lamination 11. The top edge 13 is also grooved as at 16 to receive a wire or other thread-like magnetic record member 17 (shown only in Figure 2). The core 11, of course, acts as a low magnetic reluctance path for the magnetic field about the current-carrying copper bar or foil 15 and tends to concentrate the magnetic field in the small gap 14 across which the wire or other magnetic record member 17 crosses.

The transformer core 12 may be of any suitable form, but preferably is a laminated simple rectangular shell type core having a center leg 18 upon which two pancake coils 19 and 20 are mounted. These pancake coils 19 and 20 lie on opposite sides of a copper plate 21 which in the illustrated embodiment of the present invention has the shape as illustrated most clearly in Figures 3 and 4 of the drawings. This plate 21 has a central opening 22 which enables the plate to straddle the leg 18 of the transformer core 12. The plate 21 also includes two upstanding leg portions 23 and 24 which straddle the head lamination 11 as is clearly shown in Figure 1 of the drawings.

The tops of the legs 23 and 24 are slotted as at 25 to receive the copper foil or bar 15, the bar 15 being secured to the legs 23 and 24 by solder or other suitable bonding and electrically conducting material. The copper plate 21 thus, in conjunction with the copper foil or bar 15 acts as a single-turn coil for feeding energy to or from the head lamination 11. For example, when the electromagnetic transducer head is being used to make a magnetic record on the traveling record member 17, fluctuating electric energy representing the signal to be recorded is fed to the pancake coils 19 and 20, these coils being the primary windings of the coupling transformer which feeds energy to the head lamination 11. Fluctuating electric current is thus induced in the single-turn secondary formed by the copper plate 21 and the copper bar 15. The fluctuating electric current is of high current density, thus enabling good recording on high coercive force material used as the record member 17.

The fluctuating electric current flowing through the bar 15 sets up a strong fluctuating magnetic field around the bar 15. This causes longitudinal magnetization of the traveling record member 17 as it passes across the gap 14 in the head lamination 11. On play-back, the reverse operation takes place. This same type of head may also be used as an erase head, and very satisfactory results are obtained in erasing high coercive force material.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A combined magnetic transducer head and coupling transformer comprising a transducer core having an edge arranged to have a magnetic record member pass thereover, said core having a gap therein extending inwardly from said edge, a transformer core in close proximity to said transducer core, a conducting bar extending through said gap and secured to said transducer core, a conducting plate extending around a portion of said transformer core and secured thereto, the ends of said member being electrically connected and secured to opposite ends of said bar, whereby said transducer core is mounted on said transformer core and supported by said member, and a high impedance winding wound on said transformer core substantially parallel to and in close proximity to said low impedance member.

2. A combined magnetic transducer head and coupling transformer comprising a transducer core having an edge arranged to have a magnetic record member pass thereover, said core having a slot therein extending inwardly from said edge, a transformer core in close proximity to said transducer core, a low impedance closed circuit electrically conductive member extending around a portion of said transformer core and around a portion of said transducer core and passing through said slot thereof, and a high impedance winding wound on said transformer core substantially parallel to said low impedance member and in close proximity thereto.

3. A combined magnetic transducer head and coupling transformer comprising a transducer core having an arcuate edge arranged to have a magnetic record member pass thereover, said core having a gap therein extending inwardly from said arcuate edge, a transformer core in close proximity to said transducer core, a conducting bar extending through said gap and physically secured to said transducer core, a C-shape conducting plate extending around a portion of said transformer core and secured thereto, the ends of said C-shape member being electrically connected and physically secured to opposite ends of said bar, whereby said transducer core is mounted on said transformer core and supported solely by said C-shape member, and a pair of high impedance windings wound on said transformer core on opposite sides of and in close proximity to said low impedance member.

4. A combined electromagnetic transducer head and transformer comprising a transformer core, a transducer head core having a pair of closely spaced poles, said transformer core having a central leg, a generally C-shape metal plate extending around said central leg and straddling said transducer head core, a metal bar disposed between said poles in said transducer head core and extending out on opposite sides thereof, the upper ends of said C-shape metal plate being slotted to receive said metal bar, said bar being secured to said ends of said plate and lying substantially in the plane of said plate, and a pair of relatively high impedance pancake windings also mounted on said central leg on opposite sides of and in close proximity to said metal plate.

5. A combined magnetic transducer head and coupling transformer comprising a transducer core having an edge arranged to have a magnetic record member pass thereover, said core having a slot therein extending inwardly from said edge, a transformer core in close proximity to said transducer core, a low impedance closed circuit electrically conductive member extending around a portion of said transformer core and around a portion of said transducer core and passing through said slot thereof, and a pair of high impedance windings wound on said transformer core on opposite sides of said low impedance member and in close proximity thereto.

References Cited in the file of this patent

UNITED STATES PATENTS

| Number | Name | Date |
|---|---|---|
| 2,418,542 | Camras | Apr. 8, 1947 |
| 2,423,339 | Newman | July 1, 1947 |
| 2,532,100 | Howell | Nov. 28, 1950 |
| 2,539,400 | Camras | Jan. 30, 1951 |

FOREIGN PATENTS

| Number | Country | Date |
|---|---|---|
| 612,450 | Germany | Apr. 25, 1935 |